Figure 1:
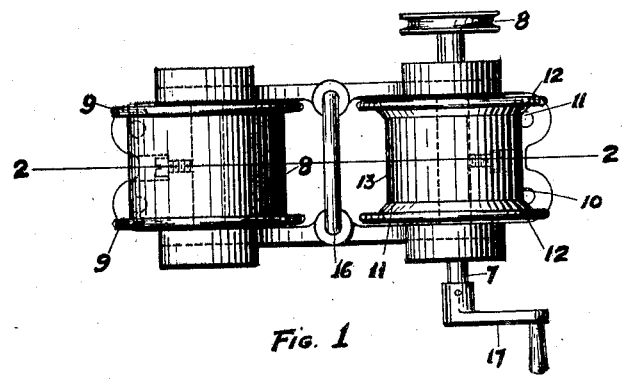
Figure 2:
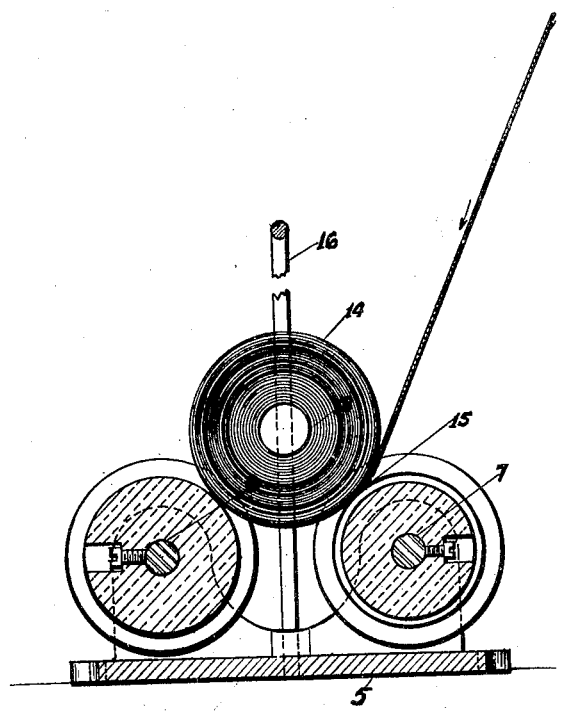

C. A. SENTOU AND E. JACQUET.
REWINDER.
APPLICATION FILED SEPT. 27, 1921.

1,437,915.   Patented Dec. 5, 1922.

INVENTOR
C. A. SENTOU.
E. JACQUET.
BY
ATTORNEY

Patented Dec. 5, 1922.

1,437,915

UNITED STATES PATENT OFFICE.

CAMILLE A. SENTOU AND ETIENNE JACQUET, OF FORT LEE, NEW JERSEY, ASSIGNORS, BY MESNE ASSIGNMENTS, TO EASTMAN KODAK COMPANY, OF ROCHESTER, NEW YORK, A CORPORATION OF NEW YORK.

REWINDER.

Application filed September 27, 1921. Serial No. 503,553.

*To all whom it may concern:*

Be it known that we, CAMILLE A. SENTOU and ETIENNE JACQUET, both citizens of the Republic of France, and residents of Fort Lee, county of Bergen, and State of New Jersey, have invented a new and Improved Rewinder, of which the following is a full, clear, and exact description.

Our invention relates to a rewinder suitable for photographic films of the type utilized in motion picture industries and has reference more particularly to a device for winding up rolls of film either by hand or motive power and is particularly suitable as an accessory for receiving film delivered by developing machines.

An object of the invention is to provide a rewinder which is not affected by the variation of the diameter of the film roll and which will permit a slippage between the winding elements of the film so as not to break the film where there is a resistance offered to the winding of the film.

Another object of the invention is to provide a rewinder which will permit the roll of film to be removed from the rewinder without stopping the motion of the rewinder or interfering with any part of the rewinder.

In the accompanying drawing forming part of the specification, Figure I is a plan of the device embodying our invention, and Figure II is a vertical section 2—2 on Figure I.

Referring to the drawing, 5 is a frame which supports two parallelly disposed shafts 6 and 7, respectively, mounted in any suitable bearings carried by the frame, so that each shaft may rotate freely. Secured to the shaft 6 is a spool 8, the flanges 9 of which are parallel and the distance between which is substantially equal or slightly larger than the width of a standard motion picture film. The shaft 7 carries a spool 10 which has annular bevels 11 spacing the flanges 12 thereof from the cylindrical part 13 of the spool. The beveled parts 11 of the spool form the traction elements of the rewinder and are adapted to engage the edge of a roll of film which is to be wound.

As shown in Figure 1 the roll of film 14 rests on the two spools 8 and 10 and the debiting end 15 of the film comes first into contact with the beveled annular portions 11 of the spool 10.

It is self evident that the bevels 11 are spaced so that the edge of the film is always in contact with the annular bevels 11 which are the traction elements of the rewinder. The flanges on the spool are merely to guide the roll of film.

As shown in the drawing the spools are constrained to move with their shafts and the shaft 7 is provided with a pulley 8' so that power may be transmitted to said shaft 7, whereby the roll of film 14 is entrained by the annular beveled faces 11 and the rotary motion imparted to the roll and transmitted thereby to the spool 8.

In cases where it is advisable to use the rewinder by hand a suitable detachable crank 17 may be provided on the shaft 7.

When starting the winding of a film on the rewinder a suitable heavy core 18 is preferably introduced so as to provide sufficient adherence between the edge of the film and the annular faces 11 when starting the winding.

In cases where the film offers resistance the winding spool 10 will rotate without entraining the roll of film for the major weight of the roll is transferred to the spool 8 due to the fact that no film is being furnished and the resultant force of the rewinder in motion and the pull on the film from the machine throws the weight of the roll on the spool 8.

We claim:

1. A rewinder comprising two flanged spools adapted to be disposed parallelly so as to support a roll of film, one of said spools having annular bevels in proximity of the flanges thereof, said bevels being adapted to engage the edge of a film on the outer periphery of the roll, and means for imparting motion to the spool having bevels.

2. A rewinder comprising two parallelly disposed spools one of said spools having annular bevels adapted to engage the edge of a film and means for imparting motion to said spool having the bevels.

3. A rewinder comprising a pair of parallelly disposed spools adapted to support a roll of film so that the roll bears with its outer periphery on said spools, means associated with one of said spools for engaging the edges of the film on the outer periphery of the roll and means for imparting a rotary motion to said spool having the means.

4. A rewinder comprising a pair of rotary elements disposed to engage the outer periphery of a roll of film so as to support said roll in a vertical position, means associated with one of said rotary elements for engaging the edge of the film on the outer periphery of the roll and means for imparting rotary motion to said element having the means for engaging the edge of the film.

CAMILLE A. SENTOU.
ETIENNE JACQUET.